UNITED STATES PATENT OFFICE.

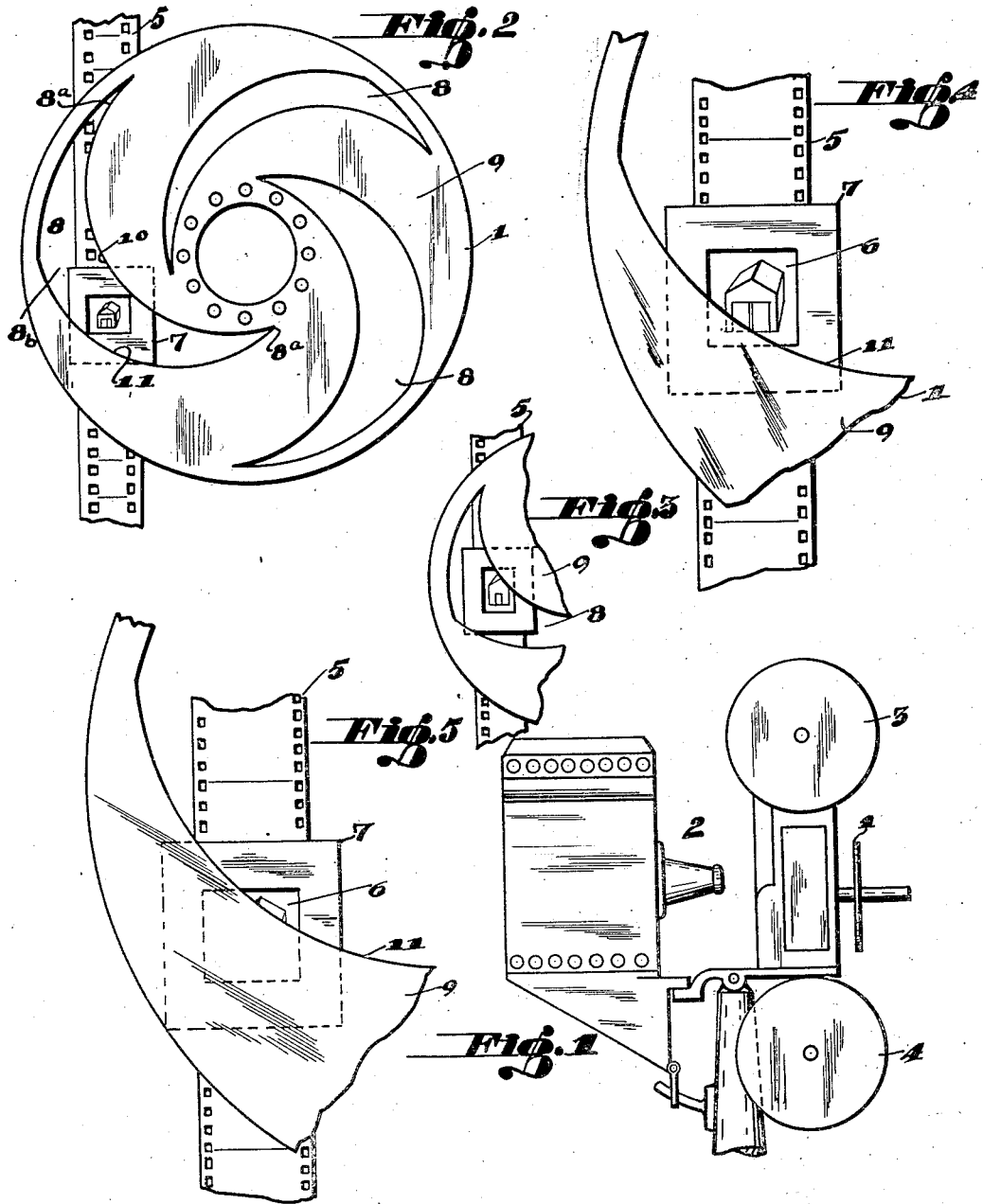

ARCHIE C. FRIST, OF LONG BEACH, CALIFORNIA.

MOTION-PICTURE-PROJECTION-MACHINE SHUTTER.

1,375,375.  Specification of Letters Patent.  Patented Apr. 19, 1921.

Application filed June 24, 1920. Serial No. 391,365.

*To all whom it may concern:*

Be it known that I, ARCHIE C. FRIST, a citizen of the United States, residing at Long Beach, in the county of Los Angeles and State of California, have invented new and useful Improvements in Motion-Picture-Projection-Machine Shutters, of which the following is a specification.

This invention relates to shutters for motion picture projection machines and has for its object the provision of a shutter having openings therein so arranged that as the shutter moves across the film positioned beneath the aperture plate the film will be gradually unmasked along arcuate lines from one corner of the film across the same to the diagonally opposite corner, and when the film has been completely unmasked it will be similarly gradually diagonally masked along arcuate lines. By this arrangement it will be found that the flicker incident to the projection of motion pictures may be greatly reduced.

The invention will be readily understood from the following description of the accompanying drawings, in which—

Figure 1 is a side elevation of a motion projection machine having the improved shutter employed in connection therewith.

Fig. 2 is a front elevation of the shutter showing the aperture plate and the motion picture film strip beneath the same, the shutter being in position with the film beneath the aperture plate completely unmasked.

Fig. 3 is a similar view with the shutter partly broken away and showing the film beneath the aperture plate nearly completely unmasked.

Fig. 4 is a similar view showing the film beneath the aperture plate at the start of the masking of the same.

Fig. 5 is a similar view showing the film nearly completely masked.

The improved shutter as shown at 1 is employed in connection with the motion picture projection machine shown at 2 and which may be of any usual or preferred construction. The upper and lower film magazines are shown at 3 and 4 and the film strip which is to be projected by the machine is shown at 5 with one of the individual films 6 positioned beneath the aperture plate 7 in the usual manner.

The improved shutter is, preferably, formed as a disk arranged to be mounted for rotation in usual manner. The disk is provided with a plurality of openings 8 arranged to pass across the film positioned beneath the aperture plate for unmasking the latter and with a plurality of intermediate blank spaces 9 arranged to mask the film 6 as the shutter is rotated.

In the improved shutter the openings 8, instead of being provided with straight sides which cause the film to be masked and unmasked along straight lines, are provided with curved sides arranged to diagonally mask and unmask the film 6 along curved lines. As an instance of this arrangement each of the openings 8 is shown as being substantially crescent shaped with curved pointed ends $8^a$ and the intermediate portion $8^b$ of greatest width. These openings are spaced at equal distances apart and they are convolutely disposed with respect to each other and with respect to the axis of the disk. That is, their inner ends are located adjacent to and substantially parallel with the opening in the center of disk 1, and their outer portions lie substantially parallel with the periphery of said disk.

Further, said openings are formed in the disk so that, as the latter is rotated during the operation of the projecting machine, the inner curved edges 10 of said openings will pass upwardly and inwardly across the opening in plate 7, and the film positioned directly behind said opening to unmask said opening and film and immediately thereafter the opposite, or outer curved edge 11 of the opening will pass upwardly and inwardly across the film that is behind the opening in plate 7 to mask the same.

In operation it will be seen that as one of the openings 8 passes across the film 6 the inner curved edge 10 of said opening will pass diagonally across the film from one corner thereof to the diagonally opposite corner, as will be clearly understood by reference to Fig. 3, and when the edge 10 has passed beyond the film 6 the latter will be completely unmasked as shown in Fig. 2. The outer curved edge 11 of the opening 8 will then start to mask the film 6 along curved lines and diagonally across the film from one corner thereof to the diagonally opposite corner, as will be clearly understood by reference to Figs. 4 and 5.

By this arrangement it will be seen that the film beneath the aperture plate will be gradually unmasked and subsequently masked along similarly curved lines which extend diagonally across the film and that by the convolute arrangement of the openings 8 in disk 1 the unmasking action begins at the lower left hand corner of the film behind the opening in plate 7 and said film is gradually unmasked along gradually increasing diagonal lines until the film and the opening in plate 7 are fully unmasked, whereupon they are gradually masked as the outer edge 11 of the opening moves upwardly across the film and opening, from the lower left hand corner to the upper right hand corner and the lines of the gradually masking action being curved and diagonally disposed.

The masking and unmasking of a film by the improved shutter is thus a semi-diaphragmatic action, approaching more closely than has heretofore been possible, a true diaphragmatic shutter action.

Various changes may be made without departing from the spirit of the invention as claimed.

What is claimed is:

1. A motion picture projection machine shutter having substantially crescent shaped openings arranged to mask and unmask a film diagonally across the same.

2. A motion picture projection machine shutter having substantially crescent shaped openings arranged to mask and unmask a film along diagonally disposed curved lines.

3. A motion picture projection machine shutter having substantially crescent shaped openings arranged to mask and unmask a film diagonally across the same and along curved lines.

4. A motion picture projection machine shutter having a convolute opening arranged so as to mask and unmask the film along diagonally disposed curved lines.

5. A motion picture projection machine shutter having a plurality of convolute openings alternating with blank spaces circumferentially of said shutter, said openings being arranged so that when the shutter is rotated the film beneath the same will be unmasked and masked along curved lines and diagonally across said film.

6. The combination with a motion picture projecting machine of a shutter having a plurality of convolutely arranged crescent shaped openings, that are adapted to mask and unmask the film along diagonally disposed curved lines.

In testimony whereof I have signed my name to this specification.

ARCHIE C. FRIST.